United States Patent [19]

Thies

[11] 4,388,860

[45] Jun. 21, 1983

[54] BELT PRESS WITH ENCLOSED HYDRAULIC ACTUATOR

[75] Inventor: Peter Thies, Ennepetal-Voerde, Fed. Rep. of Germany

[73] Assignee: Wagener Schwelm GmbH & Co., Schwelm, Fed. Rep. of Germany

[21] Appl. No.: 326,892

[22] Filed: Dec. 2, 1981

[30] Foreign Application Priority Data

Dec. 4, 1980 [DE] Fed. Rep. of Germany ... 8032251[U]

[51] Int. Cl.³ ............................................. B30B 15/06
[52] U.S. Cl. .................................. 100/270; 100/93 P; 100/99; 100/290; 100/295; 156/583.1
[58] Field of Search ................... 100/93 P, 269 A, 99, 100/258 A, 258 R, 270, 271, 290, 295; 156/580, 583.1; 425/338, 343, 384, 385, 394, 406, 410

[56] References Cited

U.S. PATENT DOCUMENTS

| 2,363,779 | 11/1944 | Duffy et al. | 100/269 A |
| 2,411,043 | 11/1946 | Klassen | 100/93 P |
| 3,808,968 | 5/1974 | Notin | 100/269 A X |

FOREIGN PATENT DOCUMENTS

| 2029853 | 1/1972 | Fed. Rep. of Germany | 100/93 P |
| 2248810 | 4/1974 | Fed. Rep. of Germany | 100/93 P |
| 14904 | of 1899 | United Kingdom | 100/269 A |
| 598766 | 3/1978 | U.S.S.R. | 156/583.1 |

*Primary Examiner*—Billy J. Wilhite
*Attorney, Agent, or Firm*—Karl F. Ross; Herbert Dubno

[57] ABSTRACT

A belt press has at least one upper and at least one lower traverse respectively having lower and upper traverse faces, connectors extending vertically between the upper and lower traverses and securing the lower traverse to the upper traverse, upper and lower press platens carried on and between the traverses and having respective upper and lower platen faces respectively confronting the lower and upper traverse faces, and a hydraulic actuator for displacing the platens toward each other and thereby pressing the platens against a belt engaged therebetween. At least one of the traverses is formed of box section. The hydraulic actuator is engaged between the traverse face of the one box-section traverse and the confronting platen face and has a U-section pressure plate having a base bearing on the confronting platen face and a pair of flanges extending toward the one traverse face, at least one cushion forming at least one substantially closed chamber and lying between the flanges, and a pump for pressurizing the chamber. The cushion bears in one direction in surface contact on the pressure plate and in the opposite direction in surface contact at least indirectly on the face of the one traverse.

12 Claims, 4 Drawing Figures

BELT PRESS WITH ENCLOSED HYDRAULIC ACTUATOR

FIELD OF THE INVENTION

The present invention relates to a belt press. More particularly this invention concerns a belt press of the type used to repair belts or to join together belt sections into an annular belt.

BACKGROUND OF THE INVENTION

A belt press normally has a plurality of upper and a plurality of lower traverses respectively having lower and upper traverse faces with the traverses all parallel and each upper traverse lying above a respective lower traverse. Upper and lower heatable press platens are carried between these traverses and in turn have respective upper and lower platen faces respectively confronting the lower and upper traverse faces. Mechanically or hydraulically actuated means is engaged between each lower traverse and the respective upper traverse for displacing the traverses toward each other and thereby pressing the platens against a belt between them. During a pressing operation the platens bend somewhat from their normally planar shape, as the platens are not made stiff enough to avoid such bending in order to cut down on equipment weight.

Normally the actuating means is provided between only one of the platens and the respective traverses. Such means normally comprises an array of screw-type or hydraulic jacks engaged between this movable platen and the respective traverses, with several such jacks between each traverse and the respective movable platen.

In order to accommodate such jacks, in particular hydraulic ones, it is necessary to cut holes in the traverses. Thus these traverses, which are usually designed to be as light as possible, are rendered rather weak and bendable.

Another disadvantage of this type of system is that even when enormous pains are taken the movable platen is unevenly pressed away from its traverse. The number of jacks must of course be finite so that it is normally not possible to evenly load the movable press platen.

OBJECTS OF THE INVENTION

It is therefore an object of the present invention to provide an improved belt press.

Another object is the provision of such a belt press which overcomes the above-given disadvantages.

SUMMARY OF THE INVENTION

These objects are attained according to the instant invention in a belt press of the above-described general type, that is comprising at least one upper and at least one lower traverse respectively having lower and upper traverse faces, connecting means extending vertically between the upper and lower traverses and securing the lower traverse to the upper traverse, upper and lower press platens carried on and between the traverses and having respective upper and lower platen faces respectively confronting the lower and upper traverse faces, and hydraulic actuating means for displacing the platens toward each other and thereby pressing the platens against a belt engaged therebetween. According to this invention at least one of the traverses is formed of box section. The hydraulic actuating means is engaged between the traverse face of the one box-section traverse and the confronting platen face and has a U-section pressure plate having a base bearing on the confronting platen face and a pair of flanges extending toward the one traverse face, at least one cushion forming at least one substantially closed chamber and lying between the flanges, and means for pressurizing the chamber. The cushion bears in one direction in surface contact on the pressure plate and in the opposite direction in surface contact at least indirectly on the face of the one traverse.

According to another feature of this invention the connecting means comprises respective upright tie bolts extending vertically between the upper and lower traverses and securing the lower traverse to the respective upper traverse. This connecting means can include means for displacing the traverses toward each other, whereby force will be transmitted through the cushion. Such an arrangement has a body of an only partly compressible fluid filling the chamber.

The cushion according to the instant invention can be a wholly elastic bladder or multicell elastic bladder. It can also be formed by a plurality of diametrally compressible but circumferentially unstretchable hydraulic hoses. These hoses have in uncompressed condition a predetermined hose diameter but are partially flattened between the plate and the traverse face of the one box-section traverse. In addition according to this invention the cross-sectional area of the hoses of the actuating means is equal to between 25% and 75% of the cross-sectional area of the hoses in uncompressed condition. What is more, the hoses are all interconnected to form a single such chamber.

It is within the scope of this invention to have a plurality of such hoses in each U-section pressure plate, extending generally parallel to the traverses and aligned thereunder. According to this invention the hoses of each of the plates engage each other laterally. These hoses are in unstressed condition of circular cross section and are formed of a filament-reinforced elastomer so that they can be deformed readily and will seek to return to their normal round shape, but so that they cannot expand circumferentially or longitudinally.

The belt press according to the instant invention may be provided with means for displacement of the plate toward and away from the traverse face of the one traverse only through a distance substantially shorter than the hose diameter.

The press of the instant invention may be provided, as described in my copending applications Ser. Nos. 286,669 and 286,670 both filed July 24, 1981, with at least one bend-compensating element having a pair of nonparallel upper and lower surfaces and engaged between one of the platen or traverse faces and either the other traverse or platen face or the confronting surface of the actuating means. Such a bend compensator cancels out the bending effect so that even pressure is exerted over the entire face of the movable platen.

The hoses according to this invention may even extend transverse to the traverses. In any case, whether they are transverse to or parallel to the traverses, they are provided on their ends with fittings that seal off their interiors. The actuating means normally also has a pressure gauge for indicating the pressure in the chamber.

The pressure plate according to the instant invention either is of thermally insulating material or is provided on one of its surfaces with a layer of insulating material.

DESCRIPTION OF THE DRAWING

The above and other features and advantages will become more readily apparent from the following, reference being made to the accompanying drawing in which.

SPECIFIC DESCRIPTION

Figure 1:
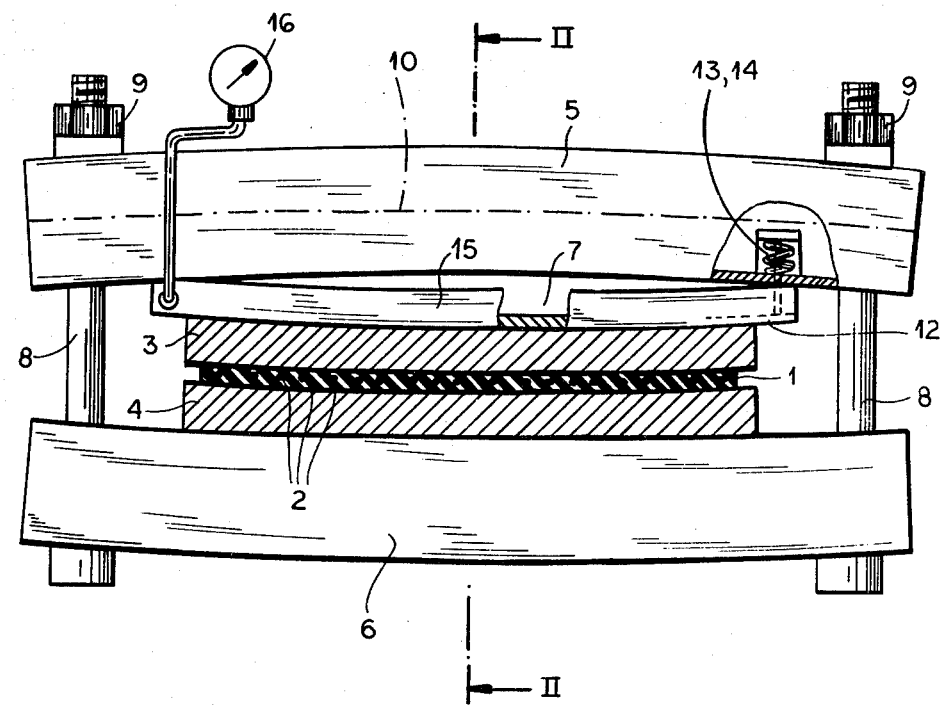
FIG. 1 is a cross section through a belt press according to this invention.

As seen in FIG. 1 a belt press for repairing or joining sections of a belt 1 having longitudinal reinforcements 2 is provided, as described in my above-cited applications to which reference can be made for specifics, with a pair of normally planar upper and lower press platens 3 and 4 received between respective upper and lower traverses 5 and 6, of which only one is visible in the drawing. These traverses 5 and 6 are formed as box beams, that is they are hollow and of rectangular section.

Vertical connecting bolts 8 whose upper ends are threaded and carry respective nuts 9 pass up through the outer end of each lower traverse 6 and through the outer end of each upper traverse 5. The nuts 9 can be tightened to urge the traverses 5 and 6 together and press the platens 3 and 4 against the belt 1, although normally these bolts 8 merely serve to fix the maximum spacing between the ends of the traverses 5 and 6. Roller bearings 21 may be provided between the lower surfaces of the nuts 9 and the upper surfaces of the respective traverses 5.

Figure 2:
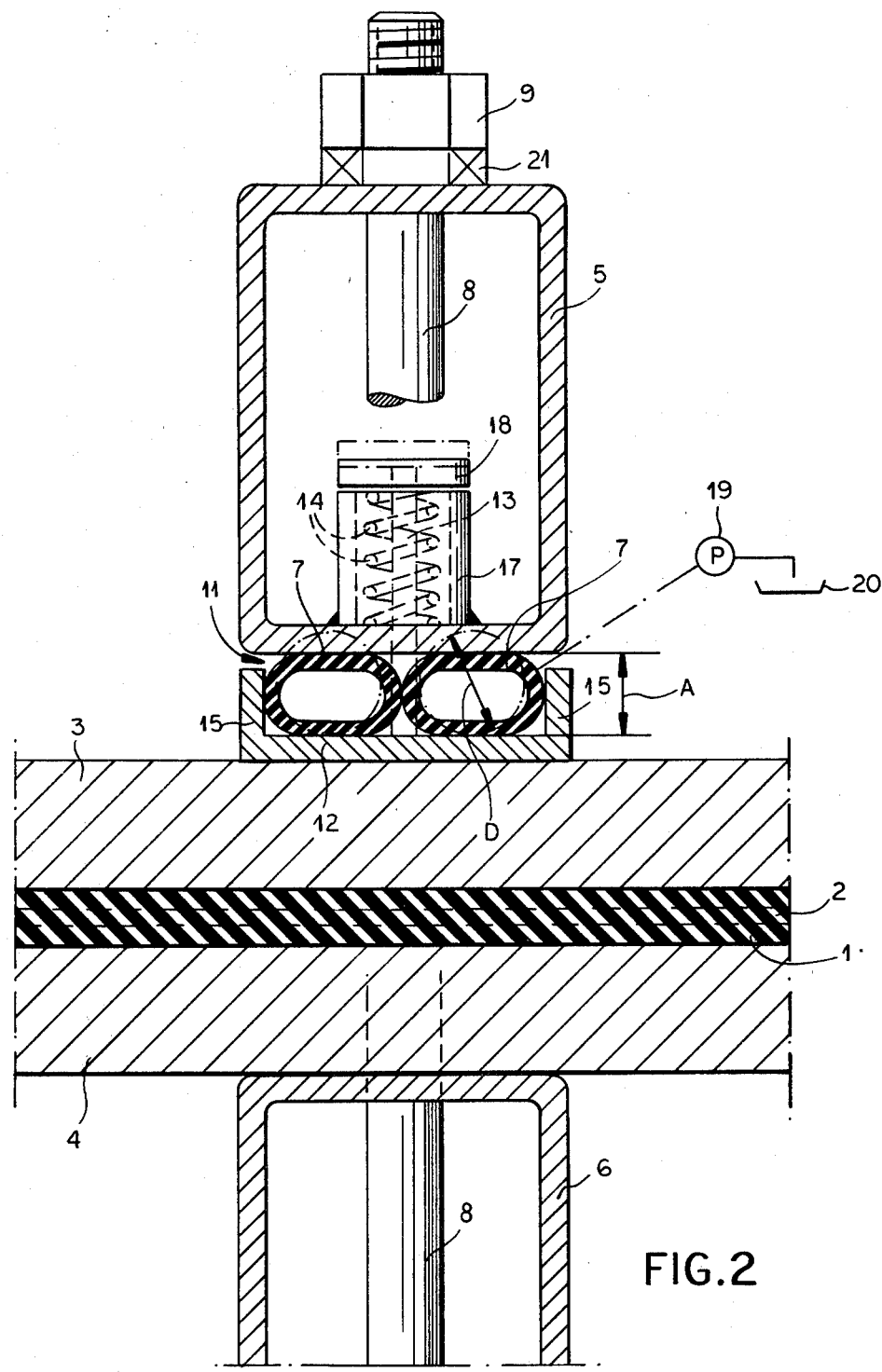
FIG. 2 is a large-scale section taken along line II—II of FIG. 1.
Figure 3:
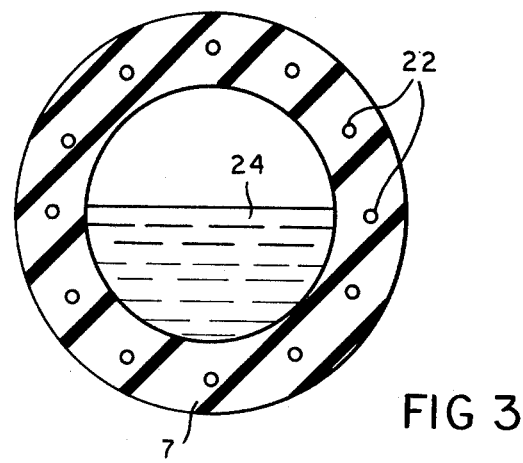
FIG. 3 is a large-scale cross section through a tube according to this invention.

As best seen in FIG. 2 the system is provided with hydraulic actuating means in the form of a pair of hydraulic hoses 7 underneath each upper traverse 5 and braced between this traverse 5 and a respective U-section pressure plate 12 bearing on the upper platen 3. The tubes 7 are in unstressed condition as also seen in FIG. 3, and are made of an elastomer provided with filament reinforcements 22. This pressure plate 12 has a pair of upwardly extending flanges 15 that laterally confine the two hoses 7 so that they are captured in the space between this channel plate 12 and the lower surface of the traverse 5. In fact the base of the plate 12 is fixed at each end to a rod 13 that extends upwardly through the lower wall of the box-beam traverse 5 and that has an enlarged head 16. A compression spring 14 surrounds each such rod 13 and is braced between its head 18 and the upper surface of the bottom traverse wall. In addition a tubular stop 17 surrounds the rod 13 and spring 14 and is engageable with the head 18 to prevent the plate 12 from moving downward away from the traverse 5 to create a spacing greater than A, which is substantially smaller than the diameter D of the hoses 7 in unstressed condition. Thus under normal operating conditions the hoses 7 are ovalized, and bear laterally against each other and against the flanges 15.

Figure 4:
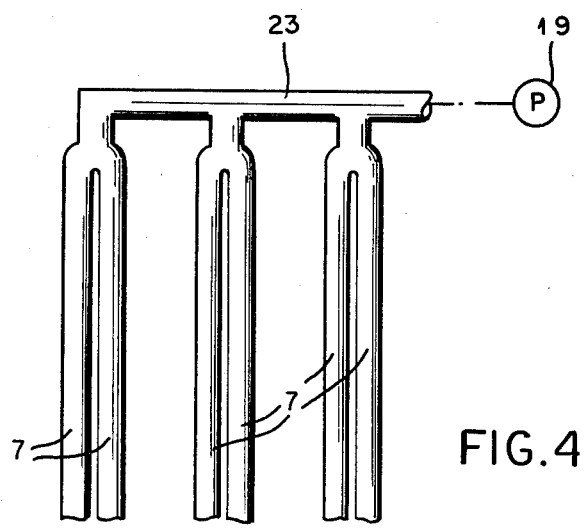
FIG. 4 is a small scale top view illustrating the interconnection of the tubes of this invention.

The tubes 7, as described in the above-cited copending applications, have fittings on their ends which seal off and interconnect their interiors, which are all interconnected as shown by conduit 23 in FIG. 4. The chamber formed by these interiors is connected to a pump 19 operating from a reservoir 20 so it can pressurize and expand these hoses 7 and thereby bring considerable force to bear via the platens 2 and 3 on the belt 1. The force thus brought to bear can be in addition to or instead of the force brought to bear by means of the bolts 8 and nuts 9, or it is even possible to use the hoses 7 merely as a force-transmitting cushion, that is without the pump 19. In this case the interiors of the hoses 7 would not be totally filled with an incompressible liquid, but would be filled partially—to about 25%—with a compressible fluid like air as shown at 24 in FIG. 3. Furthermore it is within the scope of this invention to provide a bend compensator as described in the above-cited applications between the traverse 5 and upper platen 3. A gauge 16 which has a quick-disconnect and -connect coupling is provided for reading the pressure inside the hoses 7 and therefore the pressure with which the platens 3 and 4 are bearing on the belt 1.

The belt press according to the instant invention will evenly press the belt 1 due to the hydraulic element between the upper or lower traverse and the respective platen. The use of hoses allows the cushion used for this effect to be pressurized greatly, so that considerable force can be brought to bear.

I claim:

1. A belt press comprising:
   at least one upper and at least one lower traverse respectively having lower and upper traverse faces, at least one of said traverses being formed of box section;
   connecting means extending vertically between said upper and lower traverses and securing said lower traverse to said upper traverse;
   upper and lower press platens carried on and between said traverses and having respective upper and lower platen faces respectively confronting said lower and upper traverse faces; and
   hydraulic actuating means for displacing said platens toward each other and thereby pressing said platens against a belt engaged therebetween, said means being engaged between the traverse face of said one traverse and the confronting platen face and having
      a U-section pressure plate having a base bearing on said confronting platen face and a pair of flanges extending toward said one traverse face,
      at least one cushion forming at least one substantially closed chamber and lying between said flanges, said cushion bearing in one direction in surface contact on said pressure plate and in the opposite direction in surface contact at least indirectly on said face of said one traverse, and
      means for pressurizing said chamber.

2. The belt press defined in claim 1 wherein said connecting means comprises respective upright tie bolts extending vertically between said upper and lower traverses and securing said lower traverse to the respective upper traverse.

3. The belt press defined in claim 1 wherein said cushion is formed by a plurality of diametrally compressible but circumferentially unstretchable hydraulic hoses.

4. The belt press defined in claim 3 wherein said hoses have in uncompressed condition a predetermined hose diameter but are partially flattened between said plate and said traverse face of said one traverse.

5. The belt press defined in claim 3 wherein the cross-sectional area of said hoses of said actuating means is equal to between 25% and 75% of the cross-sectional area of said hoses in uncompressed condition.

6. The belt press defined in claim 3 wherein said hoses are all interconnected to form a single such chamber.

7. The belt press defined in claim 3 wherein a plurality of such hoses are provided in each U-section pressure plate, extending generally parallel to said traverses and aligned thereunder.

8. The belt press defined in claim 7 wherein said hoses of each of said plates engage each other laterally.

9. The belt press defined in claim 3 wherein said hoses are in unstressed condition of circular cross section and are formed of a filament-reinforced elastomer.

10. The belt press defined in claim 3, further comprising means for displacement of said plate toward and away from said traverse face of said one traverse only through a distance substantially shorter than the diameter of said hoses in unstressed condition.

11. The belt defined in claim 3, further comprising a body of a only partly compressible fluid filling said chamber.

12. The belt defined in claim 11 wherein said connecting means includes means for displacing said traverses toward each other, whereby force will be transmitted through said cushion.

* * * * *